UNITED STATES PATENT OFFICE.

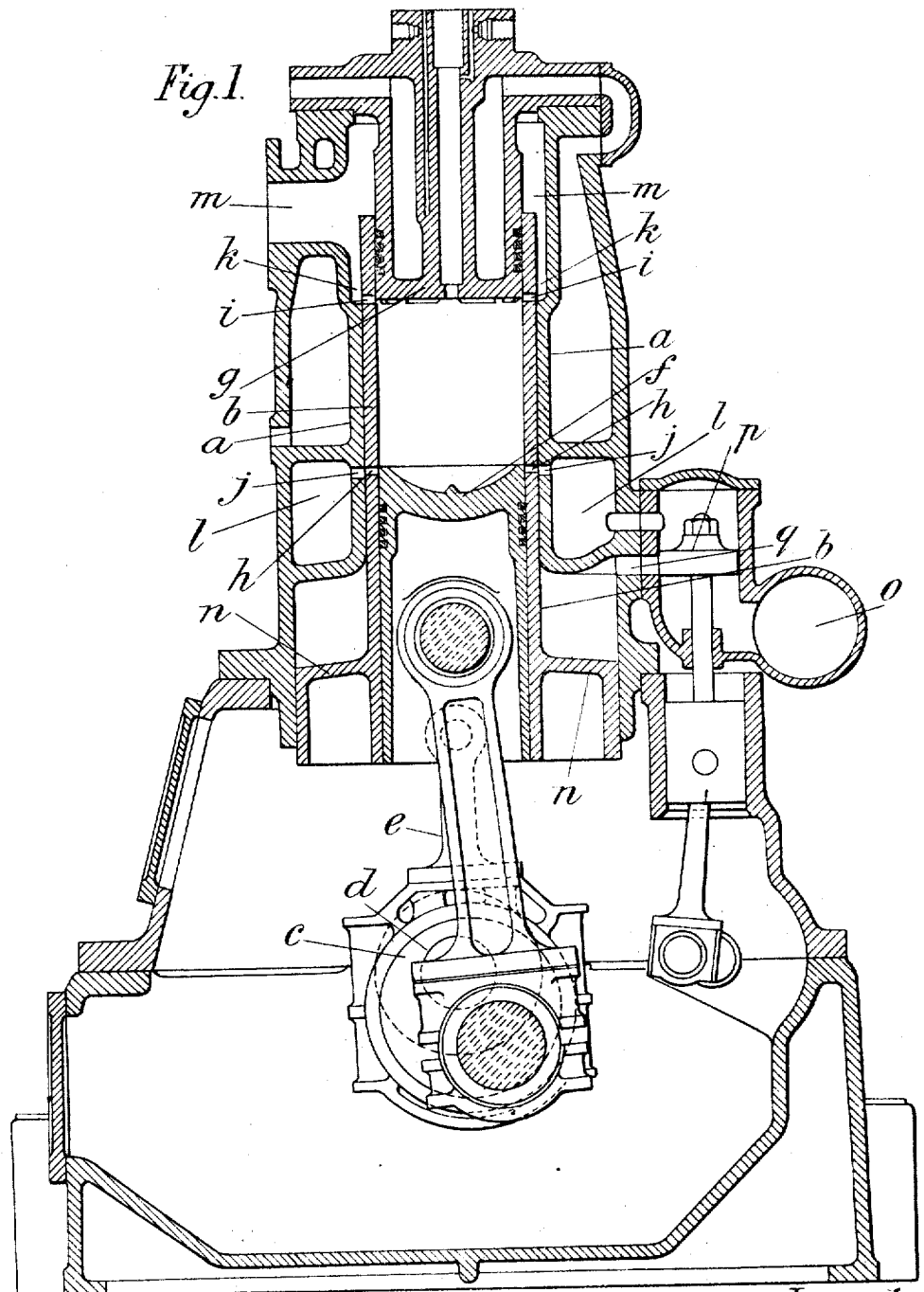

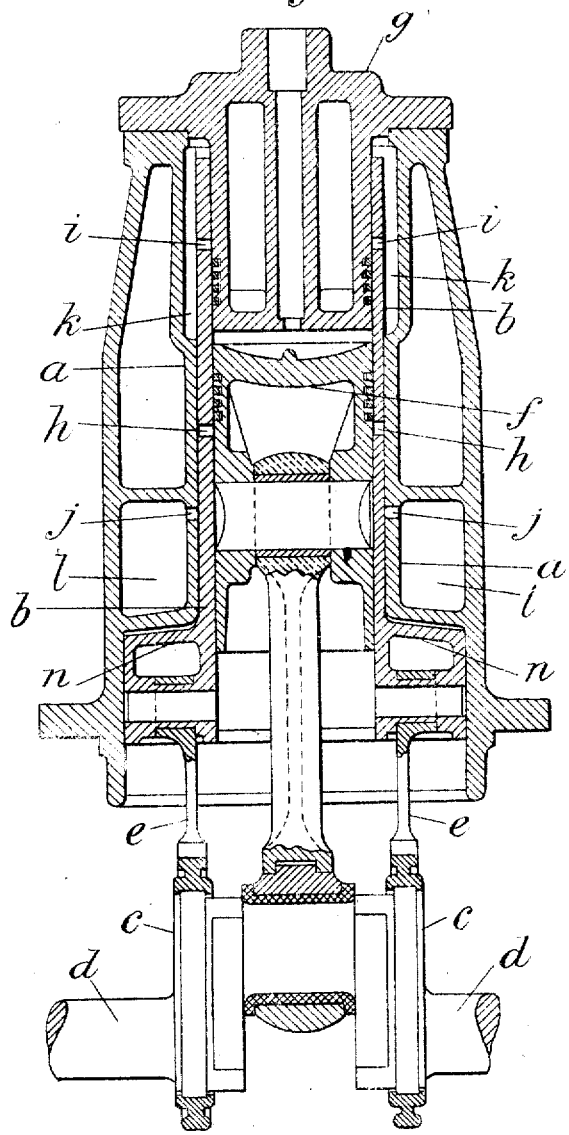

JAMES COURTHOPE PEACHE, OF RUGBY, ENGLAND, ASSIGNOR TO WILLANS & ROBINSON, LIMITED, OF RUGBY, ENGLAND.

INTERNAL-COMBUSTION ENGINE.

1,023,957.  Specification of Letters Patent.  Patented Apr. 23, 1912.

Application filed July 5, 1910. Serial No. 570,341.

*To all whom it may concern:*

Be it known that I, JAMES COURTHOPE PEACHE, a subject of the King of Great Britain, residing at Victoria Works, Rugby, England, have invented new and useful Improvements in Internal-Combustion Engines, of which the following is a specification.

This invention relates to improvements in internal combustion engines working on the two stroke cycle in which a single sleeve or liner reciprocating in the cylinder has two sets of ports which at the end of the working stroke coincide with the inlet and exhaust ports in the cylinder. The sleeve may be actuated by means of eccentrics on the crank shaft.

The piston works within the sleeve and the length of the motion imparted to the sleeve is about half the length of the piston stroke. The stroke of the sleeve and piston are in phase, or nearly so, that is as one begins its stroke in one direction the other also practically begins its stroke in the same direction and both practically arrive at the end of their stroke at the same time. Friction between the parts is greatly decreased if the sleeve moves in the same direction as the piston in the middle of the stroke when the piston is moving at its fastest, the maximum advantage being gained by making the stroke of the sleeve equal to half that of the piston, so that the rubbing speeds of the piston in the sleeve and the sleeve in the cylinder are each equal to half the actual piston speed. Preferably the eccentric actuating the sleeve is 15° in advance of the piston crank so that the exhaust ports are opened just before the opening of the inlet ports.

The drawings annexed to the specification illustrate an engine made in accordance with this invention.

Figures 1 and 2 are sections taken at right angles to each other, the various parts being in different positions.

$a$ is the cylinder in which a sleeve or liner $b$ is reciprocated by means of eccentrics $c$ on the crank shaft $d$, a rod $e$ being connected from each eccentric to the sleeve. The piston $f$ reciprocates within the sleeve $b$. The cylinder head has upon it a cylindrical projection $g$ which extends within the sleeve $b$ and is provided with packing rings.

In the sleeve $b$ are two rings of ports one ring $h$ toward the inner and one ring $i$ toward the outer end, while there are corresponding ports $j$ and $k$ in the cylinder, which ports coincide with the ports $h$ and $i$ at the end of the working stroke.

At the end of the outward stroke, that is at the end of the stroke away from the crank shaft, the outer ring $i$ of ports has passed beyond the packing rings of the cylindrical projection $g$ and the packing rings of the piston $f$ have passed the inner ring $h$ of ports in the sleeve. The explosion having taken place the piston $f$ and sleeve $b$ move toward the end of their inward strokes until toward the end of the stroke the outer ring $i$ of ports in the sleeve has passed beyond the end of the cylindrical projection $g$ and the piston $f$ as is shown in Fig. 1 is about to pass beyond the inner ring $h$ of ports in the sleeve, which ports at the end of the stroke are uncovered. At the end of the inward stroke the port $j$ leading to an annular space or receiver chamber $l$ is opposite the inner ring $h$ of ports, and the port $k$ leading to another annular space or chamber $m$ is opposite the outer ring $i$ of ports. Scavenging air is blown through the annular space or receiver chamber $l$ and through the inner rings $j$ and $h$ of ports into the sleeve, and the products of combustion are blown by the scavenging air through the outer rings $i$ and $k$ of ports and the corresponding annular chamber $m$. On the return stroke the air contained in the sleeve or liner is compressed as the piston approaches the cylinder head. With an engine of the Diesel type the fuel is injected in the usual way at the commencement of the following or working stroke. With a gas or carbureting engine, the fuel is introduced with the scavenging air at the end of the inward stroke.

For providing scavenging air an annular piston $n$ is formed on the inner end of the sleeve $b$ working in an enlarged part of the cylinder bore. $o$ is an air inlet pipe. $p$ a valve by which a port $q$ leading into the enlarged part of the cylinder bore can be opened either to the air inlet pipe $o$ or to the receiver $l$. On the outward stroke air will be driven by this annular piston through the port $q$ into a receiver $l$ and on the ports opening at the end of the next inward stroke air from the receiver will be blown through the sleeve for scavenging and charging purposes.

What I claim is:—

1. In an internal combustion engine working on the two-stroke cycle, the combination of a cylinder, a single sleeve within the cylinder open at both ends, a piston within the sleeve having a longer travel than the sleeve moving in the same direction therewith during each of its strokes and arriving at the end of each stroke at approximately the same time as the sleeve, an inlet port at one end of the sleeve, an exhaust port at the other end thereof, an inlet port at one end of the cylinder, and an exhaust port at the other end thereof.

2. In an internal combustion engine working on the two-stroke cycle, the combination of a cylinder, a single sleeve within the cylinder open at both ends, a piston within the sleeve having a longer travel than the sleeve moving in the same direction therewith during each of its strokes and arriving at the end of each stroke at approximately the same time as the sleeve, and inlet and exhaust ports in the cylinder and in the sleeve.

3. In an internal combustion engine working on the two stroke cycle, a cylinder, a single sleeve within the cylinder and open at both ends, a piston within the sleeve, an inlet port at one end of the sleeve, an exhaust port at the other end, an inlet port at one end of the cylinder, an exhaust port at the other end of the cylinder, an enlargement of the cylinder, and a piston upon the sleeve working in the enlargement and compressing air therein.

4. In an internal combustion engine working on the two stroke cycle, a cylinder open at one end, a single cylindrical sleeve fitting within the cylinder open at both ends, inlet ports at the open end of the cylinder and exhaust ports at the closed end, ports at the two ends of the sleeve at the same distance apart as the inlet and the outlet ports in the cylinder, a piston fitting within the sleeve, a crank shaft opposite the open end of the cylinder, a connecting rod extending from the piston to a crank on the crank shaft, connecting rods extending from the sleeve to cranks or eccentrics on this shaft so disposed that the sleeve is moved in phase with the piston but with a shorter travel and that the ports in the sleeve and the ports in the cylinder are closed to one another at the end of its inward stroke but are brought opposite to one another when the piston is at and near the end of its outward stroke and travels beyond them.

5. In an internal combustion engine working on the two stroke cycle, a cylinder open at one end, a single cylindrical sleeve fitting within the cylinder open at both ends, inlet ports at the open end of the cylinder and exhaust ports at the closed end, ports at the two ends of the sleeve at the same distance apart as the inlet and the outlet ports in the cylinder, a piston fitting within the sleeve, a crank shaft opposite the open end of the cylinder, a connecting rod extending from the piston to a crank on the crank shaft, connecting rods extending from the sleeve to cranks or eccentrics on this shaft so disposed that the sleeve is moved in phase with the piston but with a shorter travel and that the ports in the sleeve and the ports in the cylinder are closed to one another at the end of its inward stroke but are brought opposite to one another when the piston is at and near the end of its outward stroke and travels beyond them, an enlargement of the open end of the cylinder, an annular piston on the sleeve working in this enlargement and compressing air therein, a compressed air reservoir into which the inlet ports at the open end of the cylinder open and a valve controlling the delivery of compressed air from the enlargement of the cylinder to the reservoir.

6. In an internal combustion engine working on the two stroke cycle, a cylinder, a single sleeve within the cylinder and open at both ends, a piston within the sleeve and moving in phase therewith, inlet and exhaust ports in the cylinder and in the sleeve, an enlargement of the cylinder and a piston upon the sleeve working in the enlargement and compressing air therein.

7. In an internal combustion engine working on the two stroke cycle, a cylinder, a single sleeve within the cylinder and open at both ends, a piston within the sleeve, and having a longer travel than the sleeve, a crank, a rod connecting the piston to the crank, two eccentrics situated one each side of the crank and connections between the sleeve and the eccentrics.

JAMES COURTHOPE PEACHE.

Witnesses:
 Jno. L. Jones.
 Ivan A. E. Evans.